United States Patent [19]
Koch et al.

[11] Patent Number: 5,086,219
[45] Date of Patent: Feb. 4, 1992

[54] CIRCUIT FOR DETECTING DISCONTINUITIES IN LIGHT INTENSITY INCLUDING TWO INDEPENDENT RESISTIVE NETWORKS

[75] Inventors: Christof Koch; Wyeth Bair, both of Pasadena, Calif.

[73] Assignee: California Institute of Technology, Pasadena, Calif.

[21] Appl. No.: 620,493

[22] Filed: Nov. 30, 1990

[51] Int. Cl.$^5$ .............................................. H01J 40/14
[52] U.S. Cl. ............................... 250/208.2; 250/214 R
[58] Field of Search ...................... 250/208.2, 561, 560, 250/210, 214 R; 307/3

[56] References Cited

U.S. PATENT DOCUMENTS

| | | | |
|---|---|---|---|
| 3,845,319 | 10/1974 | Walter | 250/555 |
| 4,142,105 | 2/1979 | Erdmann | 250/548 |
| 4,697,088 | 7/1987 | Bishop | 250/561 |

OTHER PUBLICATIONS

Mead, Carver, *Analog VLSI and Neural Systems*, N.Y. Addison-Wesley, 1989, pp. 69-84, 88-89, 99, 116-121, 123-124, 260-261, 272-275, 277-278, 339-351.

*Primary Examiner*—David C. Nelms
*Assistant Examiner*—John R. Lee
*Attorney, Agent, or Firm*—Leonard Tachner

[57] ABSTRACT

A computer vision edge-detection circuit uses two independent resistive networks to smooth the voltages supplied by an array of logarithmic photoreceptors. The voltages on the two networks are substracted and exclusive-or circuitry is used to detect zero-crossings. In order to facilitate thresholding of the edges, an additional current is computed at each node indicating the strength of the zero-crossing. This is particularly important for robust real-world performance where there will be many small zero-crossings induced by noise. Implementation of the present invention using analog VLSI techniques makes it feasible, and, in fact, practical to provide a large plurality of such photoreceptors on a single integrated circuit chip. Such chips can provide image acquisition and edge-detection with noise elimination in one chip in real time.

20 Claims, 4 Drawing Sheets

CIRCUIT FOR DETECTING DISCONTINUITIES IN LIGHT INTENSITY INCLUDING TWO INDEPENDENT RESISTIVE NETWORKS

This invention was made with Government support under Contract N00014-87-K-0519 awarded by the Department of the Navy. The Government has certain rights in this invention.

TECHNICAL FIELD

The present invention relates generally to real time computer vision using analog VLSI circuits and more specifically, to a one-dimensional edge-detection circuit, the output of which is a bit pattern corresponding to the location of light intensity discontinuities.

BACKGROUND ART

A large number of computer vision algorithms for finding intensity edges, as well as for performing other vision functions, have been developed within the framework of minimizing an associated "energy" functional. Such a variational formalism is attractive because it allows a priori constraints to be explicitly stated. The single most important constraint is that the physical processes underlying image formation, change slowly in space. For example, the depths of neighboring points on a surface are usually very similar. Standard regularization algorithms embody this smoothness constraint and lead to quadratic variational functionals with a unique global minimum. These quadratic functionals can be mapped onto linear resistive networks, such that the stationary voltage distribution, corresponding to the state of least power dissipation, is equivalent to the solution of the variational functional. Smoothness breaks down, however, at discontinuities caused by occlusions or differences in the physical processes underlying image formation (e.g., different surface reflectance properties). Detecting these continuities becomes crucial, not only because otherwise smoothness is incorrectly applied, but also because the locations of discontinuities are usually required for further image analysis and understanding.

The zero-crossings of the Laplacian of the Gaussian, $\nabla^2 G$ are often used for detecting edges. It is straightforward to show that these zero-crossings usually correspond to the location of edges. Laplacian filters, which have been used widely in computer vision systems, can be approximated by the difference of two Gaussians with different space constants. These filters have been used to help computers localize objects. They work because discontinuities in intensity frequently correspond to object edges.

The present invention takes the difference of two resistive-network smoothings of one-dimensional photoreceptor input signals and finds the resulting zero-crossings. The Green's function of the resistive network, a decaying exponential, differs from the Gaussian, but simulations with digitized camera images have shown that the difference of exponentials gives results nearly as good as the difference of Gaussians. Furthermore, resistive networks have a natural implementation in silicon, while implementing the Gaussian is cumbersome. Resistive networks are described in a book entitled Analog VLSI and Neural Systems by Carver Mead, published in 1989 by Addison Wesley Publishing Company and specifically in Appendix C of that book, beginning at page 339. In addition, the application of a single resistive network to edge-enhancement for different values of the space constant of such resistive network is discussed in the aforementioned Carver Mead book beginning at page 272. However, neither the aforementioned Carver Mead reference, nor any other prior art reference known to the applicants herein, has disclosed the use of the difference in voltages between two resistive networks to detect edges, nor is there any known disclosure of a complete circuit for indicating the detection of edges in a computer vision system and for providing a threshold which is adjustable for permitting the recognition of only significant changes in light intensity, whereby to overcome noise-induced small changes in light intensity which are not likely to be indicative of a true edge.

SUMMARY OF THE INVENTION

The circuit of the present invention employs two independent resistive networks to smooth the voltages supplied by a plurality of one-dimensionally arrayed logarithmic photoreceptors. The voltages on the two networks are subtracted and exclusive-or circuitry is used to detect zero-crossings. The photoreceptors logarithmically map light intensity to voltages that are applied via a conductance onto the respective nodes of two linear resistive networks. The resistances of these two networks can be selectively adjusted to achieve different space constants. Transconductance amplifiers compute the difference of the smoothing network node voltages and provide a current proportional to that difference. The sign of current then drives exclusive-or circuitry between each pair of neighboring nodes. The ultimate output is a sequence of bits, corresponding to the number of pixels, indicating the presence or absence of zero-crossings. In order to facilitate thresholding of edges, an additional current is computed at each node, indicating the strength of the zero-crossing. The strength of each zero-crossing in this context signifies the amplitude of the slope (i.e., the spatial derivative), of the zero-crossing. Real edges have large slopes at their zero-crossing, while zero-crossings due to noise will usually be associated with small slopes. Zero-crossing strength thresholds are particularly important for robust real-world performance where there will be many small zero-crossings due to noise. The implementation of the present invention in a preferred embodiment shown herein, may be used to provide at least 64 such photoreceptors or pixels in a one-dimensional array and all of the associated circuitry for generating the edge-detection output signals on a unitary integrated circuit chip.

OBJECTS OF THE INVENTION

It is therefore a principal object of the present invention to provide an edge-detection circuit for use in computer vision applications, wherein two independent resistive networks are used to smooth the voltages supplied by a plurality of logarithmic photoreceptors, the voltages on the two networks being subtracted and exclusive-or circuitry then being used to detect zero-crossings which correspond to discontinuities in intensity detected over the photoreceptors.

It is an additional object of the present invention to provide a computer vision edge-detection circuit in which two one-dimensional resistive networks, coupled to a one-dimensional array of photoreceptors, are used to compute an approximation of the second derivative of light intensity on such photodetectors for generating an output signal, the bit pattern of which corresponds to the location of intensity discontinuities.

It is still an additional object of the present invention to provide a single IC chip zero-crossing circuit for computer vision real time edge-detection and having an adjustable threshold capability for disregarding noise induced zero-crossings.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
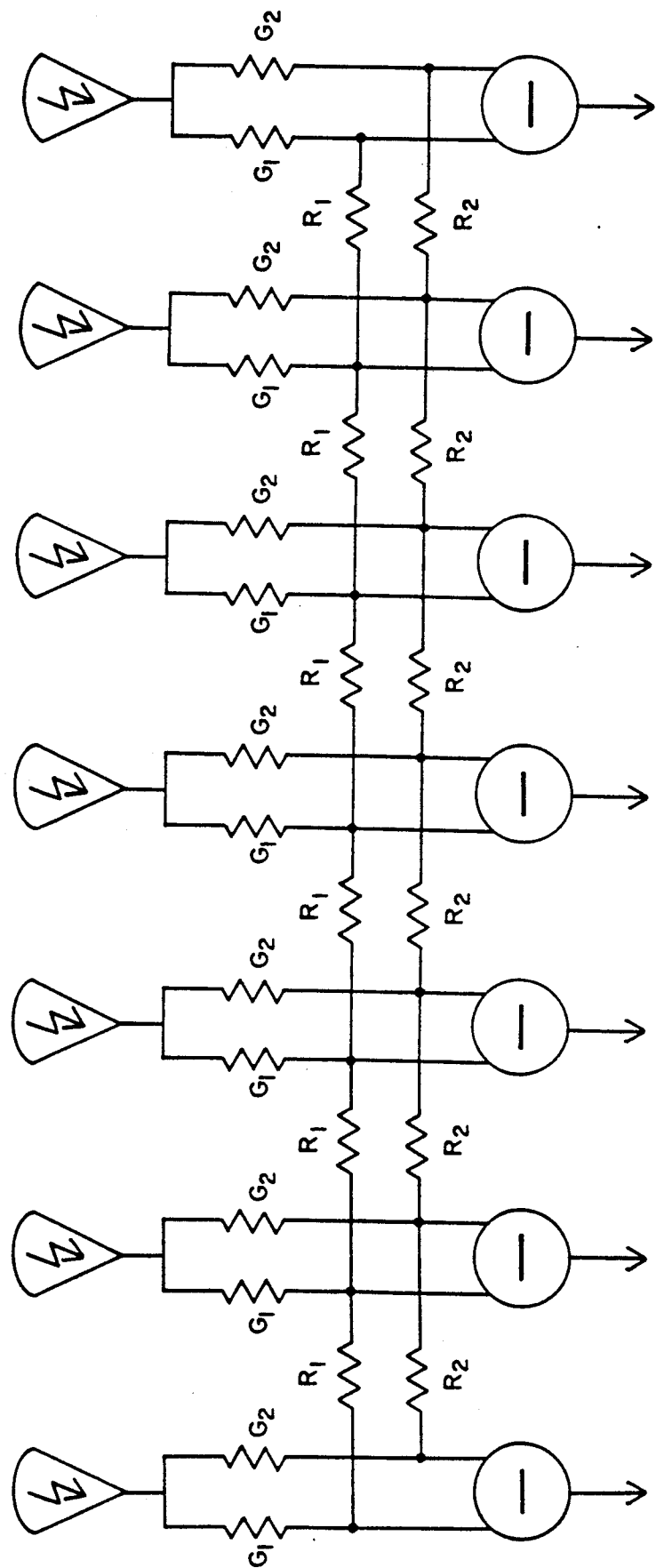
FIG. 1 is a schematic drawing showing the photoreceptors, resistive networks and subtractors used in the present invention.

Referring now to FIG. 1, it will be seen that in an exemplary embodiment of the present invention comprising a linear array of seven pixels implemented as phototransistors, there are a plurality of conductances $G_1$ and $G_2$ and a pair of smoothing resistive networks, one in which the resistance values are $R_1$ and the other in which the resistance values are $R_2$. The phototransistors logarithmically map light intensity to voltages that are applied through the respective conductances $G_1$ and $G_2$ onto the nodes of the two linear resistive networks. The network resistances $R_1$ and $R_2$ can be selectively adjusted to achieve different space constants in such networks. Thus, there are two nodes associated with each phototransistor. One such node is part of the $G_1$ conductance and $R_1$ network resistances and the other such node is part of the $G_2$ conductance and $R_2$ network resistances. As shown further in FIG. 1, the voltage available at each such node is applied to respective inputs of a differential amplifier or other similar subtraction device which computes the difference of the smoothed network node voltages and generates a current proportional to that difference. These different currents for the respective phototransistors or nodes thereof, are then applied to an exclusive-or circuit (not shown in FIG. 1) between each pair of neighboring pixels. The output of each such exclusive-or circuit is a binary signal, indicating whether or not a zero-crossing has occurred between those two pixels.

Figure 2:
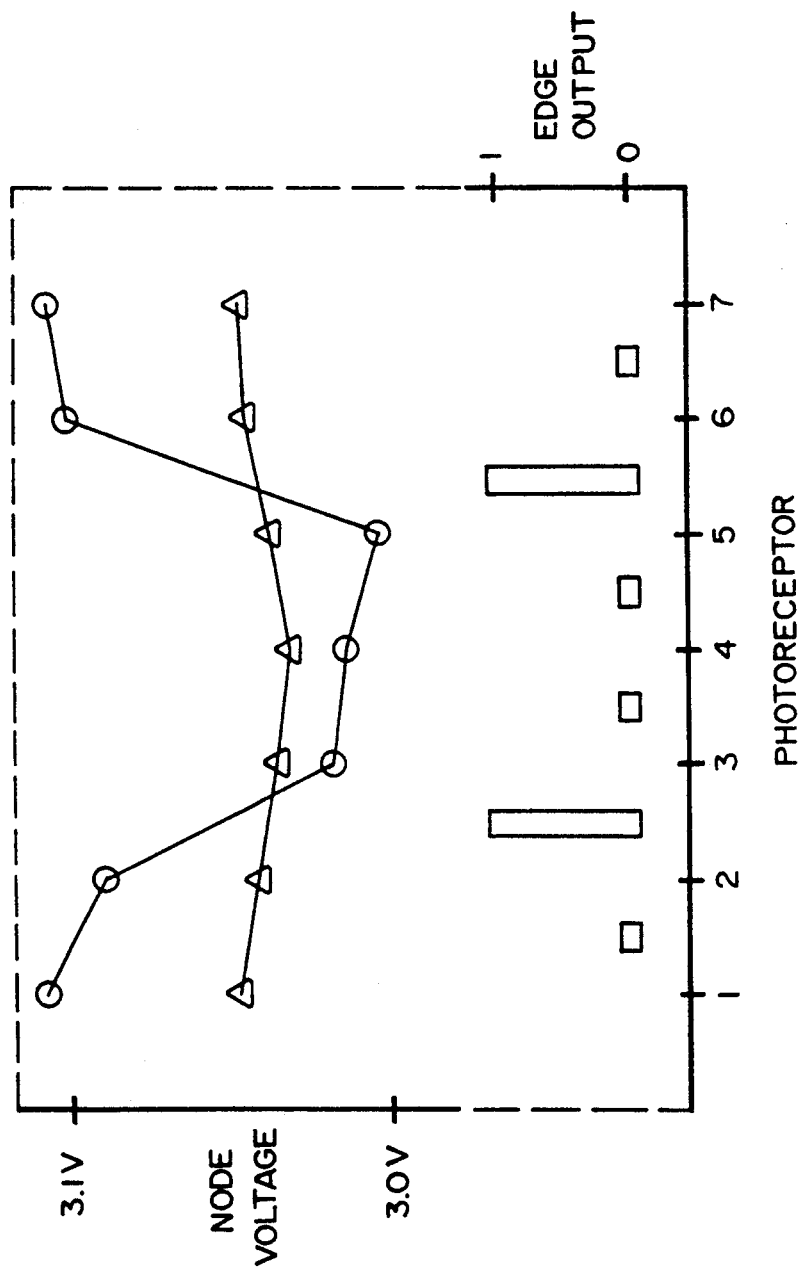
FIG. 2 is a graphical representation of node voltage responses for each of the photoreceptors and resistive networks of FIG. 1 and a binary output corresponding to the locations of zero-crossings of such node voltages.

FIG. 2 is a graph illustrating this process for the seven phototransistors circuit of FIG. 1. More specifically, the top of the graph of FIG. 2 shows the two sets of node voltages for the seven phototransistors, one corresponding to each resistive network. The two waveforms shown on the upper portion of the graph of FIG. 2 thus correspond to the waveforms generated by the respective resistive networks. The waveform illustrated with a number of circles, corresponds to the waveform interconnected with a plurality of triangles, corresponds to the resistive network having a larger space constant. These two waveforms correspond to the same set of phototransistor voltages with different degrees of smoothing. Each vertically aligned circle and triangle corresponds to a respective photoreceptor or phototransistor which, in turn, corresponds to a single pixel in a one-dimensional array.

The bottom portion of the graph of FIG. 2 is a binary output bar chart with the taller bars between photoreceptors 2 and 3 and 5 and 6, respectively, indicating that a zero-crossing has been detected at each of those locations. This indicates that there is an edge that has been detected between those corresponding photoreceptors.

Figure 3:
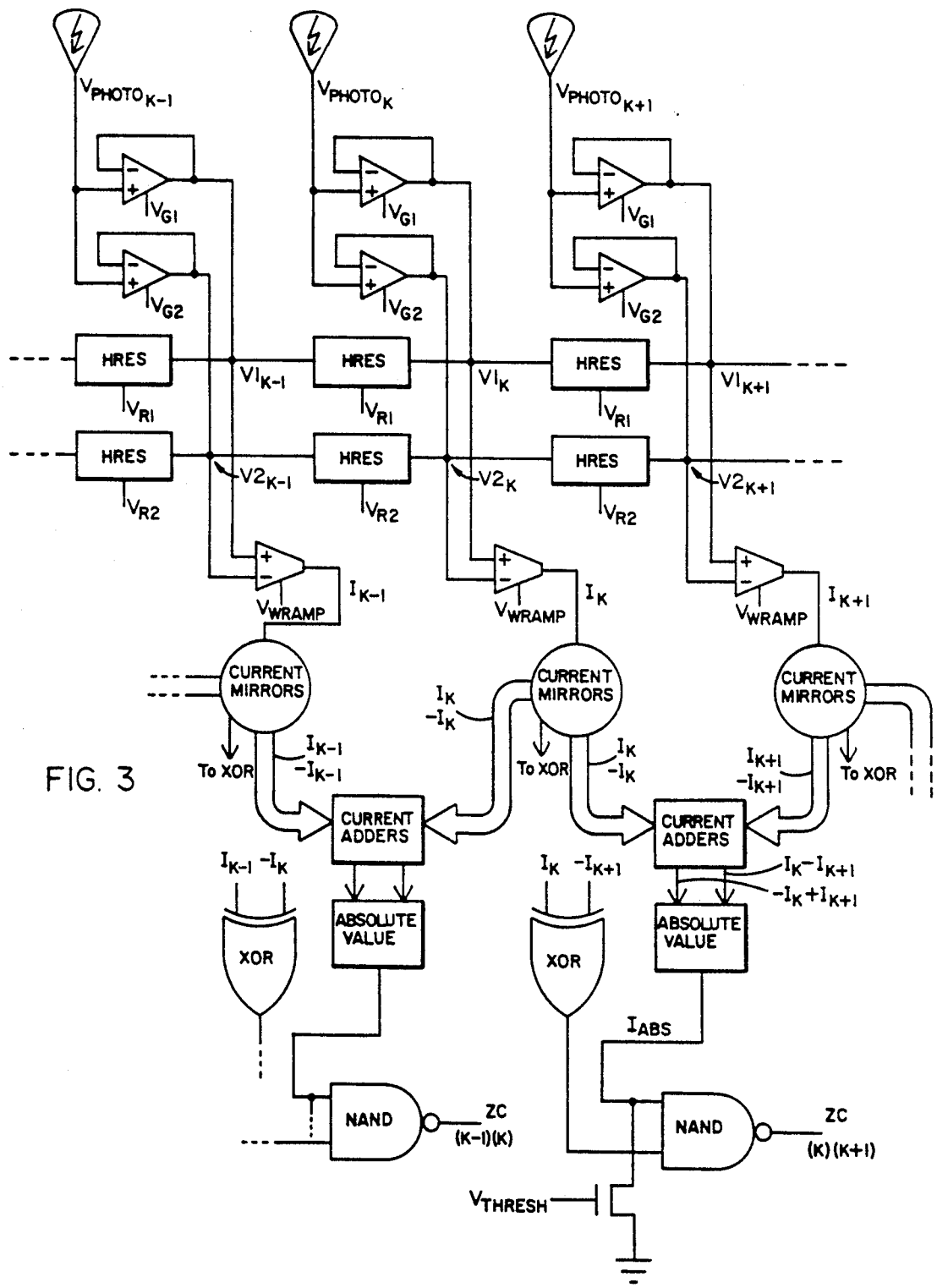
FIG. 3 is a block diagram representation of the actual implementation of the circuit of the present invention.

An actual implementation of the circuit of FIG. 1 may be understood best by referring to FIG. 3 which shows the specific functional elements of the present invention in block diagram form. Referring to FIG. 3, it will be seen that there are a plurality of photoreceptors, each one corresponding to a pixel of a one-dimensional photodetector array. Such photoreceptors produce a voltage output which is proportional to the logarithm of the light intensity on the photoreceptor.

As shown further in FIG. 3, the outputs of the photoreceptors are each applied to a pair of transconductance amplifiers, each connected as a follower with a bias voltage $V_{G1}$, and $V_{G2}$ respectively. These bias voltages determine the conductances $G_1$ and $G_2$ between the photoreceptors and the two nodes of the resistive networks. The output of each such transconductance amplifier is applied to a node of a respective resistive network. As shown in FIG. 3, in the implementation of a preferred embodiment of the present invention, each such network comprises a plurality of horizontal resistors or HRES circuits.

Figure 4:
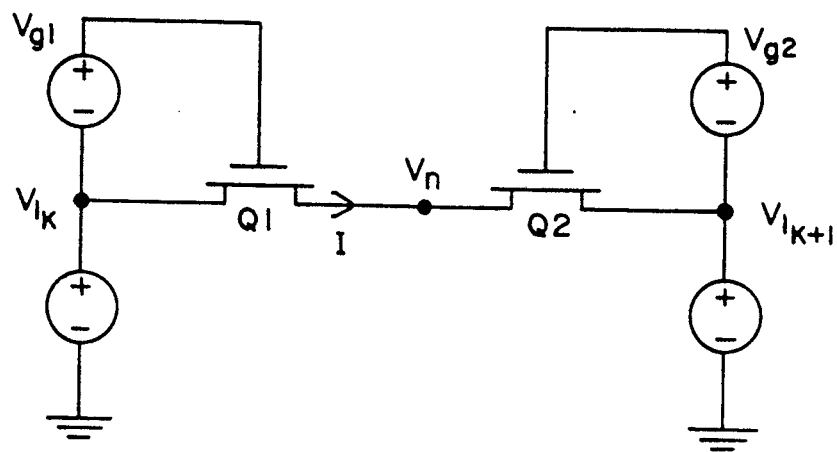
FIGS. 4 and 5 are schematic illustrations of a horizontal resistor circuit used in a preferred embodiment of the invention.
Figure 5:
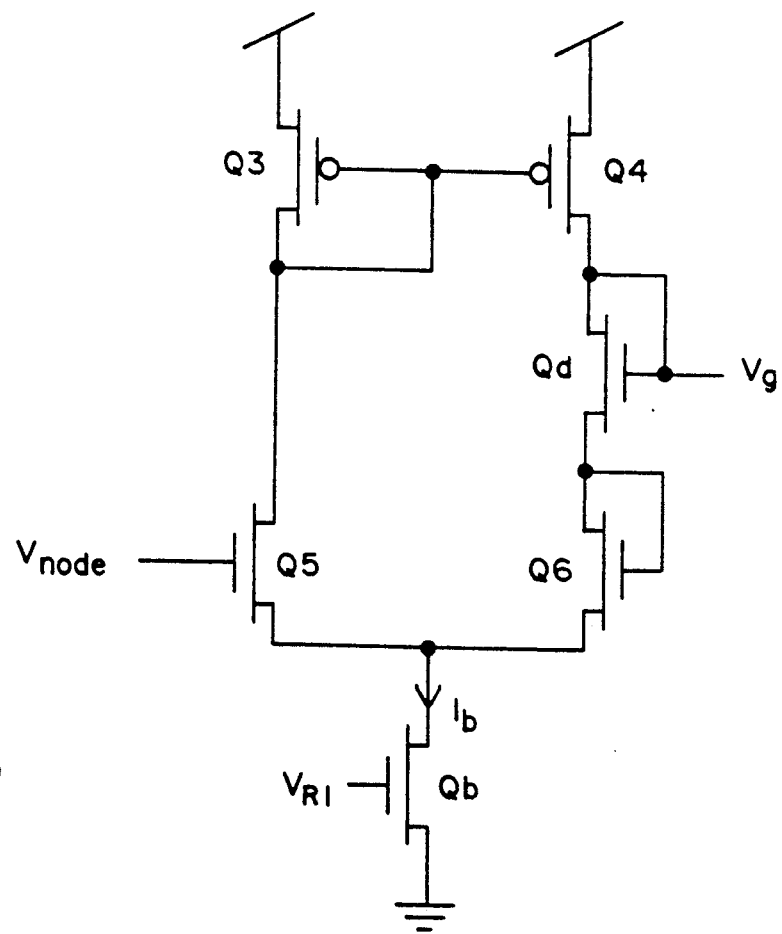

FIGS. 4 and 5 illustrate the conventional implenetation of a horizontal resistor. As shown therein, a resistive connection is formed by two pass transistors Q1 and Q2 in series. The gate voltage of each such transistor is set at a fixed value above the input voltage $V1_k$ or $V1_{k+1}$. This bias voltage controls the saturation current of transistors Q1 and Q2 and therefore sets the effective resistance of the resistive connection. For $V1_k$ greater than $V1_{k+1}$, $V1_k$ acts as the drain of Q1, and the intermediate node $V_n$ acts as the source of Q1 and the drain of Q2. The saturation current of Q1 is higher than that of Q2, because the gate-source voltage of Q1 is higher than that of Q2. The current I is limited by Q2, and saturates for $V1_k - V1_{k+1}$ much greater than $kT/q$ because the gate-source voltage of Q2 is set by the bias voltage. For $V1_{k+1}$ greater than $V1_k$, the roles of Q1 and Q2 are reversed, and I is negative. For $V1_k$ approximately equal to $V1_{k+1}$, the circuit of FIG. 4 acts like a resistor with an effective resistance of $$\frac{2kT/q}{I_{sat}}.$$

The bias-voltage generator circuit of FIG. 5 controls the saturation current of the resistive connection of FIG. 4 and thus the effective resistance thereof. The node labeled Vnode senses the network voltage at a network node—for example, $V1_k$—and the circuit generates and output voltage Vg (i.e., Vg1) to bias the gates of the pass transistors connected to that node, i.e. Q1 of FIG. 4 and the Q2 transistor of the adjacent horizontal resistor resistive connection. The voltage at the gate of Q6—which is connected to the source of Qd—follows the node voltage Vnode. The output voltage Vg will follow the node voltage, but with a positive offset equal to the voltage across Qd. The diode-connected transistor Qd has both its source and gate voltage equal to those of the pass transistor. Half of the bias current Ib is flowing in Qd. The saturation current of Qd will be the saturation current of the resistive connection, independent o the node voltage. The bias current Ib biases the diode-connected transistor Qd. Thus the voltage across Qd, and hence the gate-source voltage of the pass transistor (i.e., Q1 or Q2 of FIG. 4) is set by the bias current Ib. Thus, the horizontal resistor of the respective resistive networks, each comprises two pass transistors in series, forming a conductive path between the nodes of neighboring photoreceptors. One of the two transistors limits the current flowing therethrough, depending upon which node voltage is higher. The current through the horizontal resistor is linear for small voltage differences between the two nodes and saturates at high voltage differences at a value set by a gate bias which may be provided by a bias circuit. One such bias circuit is associated with each node of each such horizontal resistor. The inputs to the bias circuits for one network are all connected to one pad. Thus, the voltage $V_{R1}$ may be adjusted independently of the voltage $V_{R2}$ to set the resistance characteristic of the horizontal resistors of one resistive network of FIG. 3 to a different value than those of the other resistive network.

The use of adjustable transconductance amplifiers to select the desired conductances $G_1$ and $G_2$ for each network and the use of bias circuits to set the desired resistance for each HRES network, permits adjustment of these parameters at selected integrated circuit chip terminals. This feature permits a user to provide the degree of smoothing appropriate for maximum functional efficiency for given light conditions and edge-detection requirements consistent with the threshold capability of the invention which will be discussed hereinafter.

The node voltages, that is, the set of voltages between the respective horizontal resistors in each of the resistance networks are then applied to a plurality of subtractor circuits. In the embodiment illustrated in FIG. 3, the subtractor circuits comprise wide-range transconductance amplifiers. One such wide-range transconductance amplifier is used for each photoreceptor circuit. It receives two inputs, one from each of the corresponding nodes of the resistive network. Each wide-range transconductance amplifier supplies a current related to the difference in voltages across its inputs.

Each wide-range amplifier shown in FIG. 3 has associated with it, additional current-mirroring transistors which permit the production of copies of its output current, as well as negated copies of its output current. Using current mirroring transistors, the wide range transconductance amplifier associated with each photoreceptor, provides eight outputs in the form of four positive copies of the current corresponding to the difference between the resistive network voltages for that node and four negative currents of the same magnitude.

The goal of the processing corresponding to each node, is to yield one bit of information indicating whether there is a zero-crossing between, for example, node K and node K+1. A zero-crossing means a positive to negative or negative to positive transition in the output current of the wide-range amplifiers. Additional circuitry implements a threshold which causes a zero-crossing to be ignored if the difference in the output of neighboring wide-range amplifiers is not greater than an adjustable threshold.

In order to accomplish all of these goals, one copy of the positive current for node K is added to a copy of the negative current from node K+1 to provide a signed magnitude of the difference between node K and K+1. This difference is an output indicating the strength of the zero-crossing, if indeed one exists, between nodes K and K+1. An additional positive current copy of node K is added to the next node's copy of the negative current to find the difference in currents. The negative of this current difference is produced by using an addition process between a negative current copy of node K and a positive current copy of node K+1. An absolute value circuit, uses these opposed value currents to yield a positive current equal to the magnitude of the difference of the neighboring wide-range amplifier output currents. This output current $I_{ABS}$ will be compared to the threshold current to determine whether to report a zero-crossing, if one exists.

An additional copy of the positive current of the K-node and a negative copy of the K+1 node, are applied to high impedence inputs of an exclusive-or circuit. The high impedence inputs to this circuit provide binary signals such as 5 volts for any positive current output and 0 volts for any negative current output. The output of the exclusive-or circuit indicates, by a corresponding binary output, whether there is a presence or absence of a zero-crossing between the K and the K+1 node.

The current $I_{ABS}$ and the output of the exclusive-or circuit XOR are both applied to a Nand gate shown in FIG. 3. However, the input to the Nand gate to which the $I_{ABS}$ current is applied, is also connected to a threshold transistor which is designed to draw current from that input depending upon the value of a threshold voltage which may be arbitrarily selected. If the current $I_{ABS}$ is sufficiently large, meaning that the zero-crossing has a sufficiently high slope grade, then that current will charge up the input to the Nand gate to 5 volts. Thus if the output of the exclusive-or circuit XOR is also 5 volts, the Nand circuit will produce a zero volt output, indicative of a zero-crossing. On the other hand, if the current $I_{ABS}$ is smaller than the current through the threshold transistor, then regardless of the output of the exclusive-or circuit, the output of the Nand gate will indicate no zero-crossing. The circuit of the present invention thus makes it possible to ignore small magnitude zero-crossings, indicative of noise-induced zero-crossings in which the magnitude of the slope of the zero-crossing is below a selected threshold.

It will now be understood that what has been disclosed herein, comprises a computer vision edge-detection circuit using two independent resistive networks to smooth the voltages supplied by an array of logarithmic photoreceptors. The voltages on the two networks are subtracted and exclusive-or circuitry is used to detect zero-crossings. In order to facilitate thresholding of the edges, an additional current is computed at each node indicating the strength of the zero-crossing. This is particularly important for robust real-world performance where there will be many small zero-crossings induced by noise. Much of the components described herein are also described as independent elements in a prior art text entitled Analog VLSI in Neural Systems by Carver Mead. Implementation of the present invention using analog VLSI techniques makes it feasible, and, in fact, practical to provide a large plurality of such photoreceptors on a single integrated circuit chip. The inventors hereof have implemented such an integrated circuit chip with 64 such photoreceptors and corresponding node and zero-crossing circuitry. Such chips can provide image acquisition and edge-detection with noise elimination in one chip in real time.

Those having skill in the art to which the present invention pertains, will now as a result of the applicants' teaching herein, perceive various modifications and additions which may be made to the invention. By way of example, implementations of the present invention in other than analog VLSI integrated circuit chips may be provided while still preserving the features of the invention. Furthermore, the present invention is also suitable for use in a two-dimensional configuration using two-dimensional arrays of photoreceptors and corresponding resistive networks. Such a two-dimensional embodiment would also be readily implemented on a single integrated circuit chip. Accordingly, it will be understood that all such modifications and additions are deemed to be within the scope of the invention which is to be limited only by the claims appended hereto and their equivalents.

We claim:

1. An edge-detection circuit comprising:
   a plurality of substantially adjacent photoreceptors;
   a first resistive network having a plurality of nodes, a respective such node being connected to each respective photoreceptor;
   a second resistive network having a plurality of nodes, a respective such node being connected to each respective photoreceptor;
   said first and second resistive networks having different space constants;
   means for generating a signal proportional to the difference in voltage between the nodes corresponding to each photoreceptor; and
   means for indicating relative to said photoreceptors where said signal passes through a zero magnitude.

2. The circuit recited in claim 1 wherein said indicating means comprises a plurality of exclusive-or circuits, each such exclusive-or circuit being connected for receiving said difference proportional signals corresponding to a respective pair of adjacent photoreceptors.

3. The circuit recited in claim 1 wherein each of said first and second resistive networks comprises a plurality of transconductance amplifiers, each connected as a follower for presenting a conductance determined by a bias voltage.

4. The circuit recited in claim 1 wherein each of said first and second resistive networks comprises a plurality of horizontal resistors each presenting a resistance determined by a bias voltage.

5. The circuit recited in claim 1 wherein said signal generating means comprises a plurality of wide-range transconductance amplifiers.

6. The circuit recited in claim 1 further comprising means for discriminating between where said signal passes through a zero magnitude with a slope below a selected threshold and where said signal passes through a zero magnitude with a slope at or above said selected threshold.

7. The circuit recited in claim 6 wherein said discriminating means comprises means for generating a current equal to the magnitude of the difference of said signals between each adjacent pair of photoreceptors.

8. The circuit recited in claim 1 wherein said photoreceptors are configured as a one-dimensional array of photoreceptors.

9. In a unitary integrated circuit device, an edge-detection circuit for indicating the position of light intensity discontinuities; the circuit comprising:
   a plurality of substantially adjacent photoreceptors;
   a first resistive network having a plurality of nodes, a respective such node being connected to each respective photoreceptor; a second resistive network having a plurality of nodes, a respective such node being connected to each respective photoreceptor;
   said first and second resistive networks having different space constants;
   means for generating a signal proportional to the difference in voltage between the nodes corresponding to each photoreceptor; and
   means for indicating relative to said photoreceptors where said signal passes through a zero magnitude.

10. The circuit recited in claim 9 wherein said indicating means comprises a plurality of exclusive-or circuits, each respective such exclusive-or circuit being connected for receiving said difference proportional signals from a respective pair of adjacent photoreceptors.

11. The circuit recited in claim 9 wherein each of said first and second resistive networks comprises a plurality of transconductance amplifiers, each connected as a follower for presenting a conductance determined by a bias voltage.

12. The circuit recited in claim 9 wherein each of said first and second resistive networks comprises a plurality of horizontal resistors each presenting a resistance determined by a bias voltage.

13. The circuit recited in claim 9 wherein said signal generating means comprises a plurality of wide-range transconductance amplifiers.

14. The circuit recited in claim 9 further comprising means for discriminating between where said signal passes through a magnitude with a slope below a selected threshold and where said signal passes through a zero magnitude with a slope at or above said selected threshold.

15. The circuit recited in claim 14 wherein said discriminating means comprises means for generating a current equal to the magnitude of said signals between each adjacent pair of photoreceptors.

16. The circuit recited in claim 9 wherein said photoreceptors are configured as a one-dimensional array of photoreceptors.

17. A method for detecting discontinuities in light intensity; the method comprising the steps of:
   a) providing a plurality of photoreceptors;
   b) providing first and second smoothing networks for generating two different smoothing functions of voltages generated by said photoreceptors;
   c) generating a signal proportional to the difference in said voltages corresponding to each said photoreceptor;
   d) determining where, relative to said photoreceptors, said signal passes through a zero magnitude.

18. The method recited in claim 17 further comprising the step of:
   e) discriminating between where said signal passes through zero magnitude with a slope below a selected threshold and where said signal passes through zero magnitude with a slope at or above said selected threshold.

19. The method recited in claim 17 wherein step b) comprises the step of providing two resistive networks having different space constants.

20. The method recited in claim 17 wherein step a) comprises the step of providing a one-dimensional array of photoreceptors.

* * * * *